US008577996B2

(12) United States Patent
Hughes et al.

(10) Patent No.: US 8,577,996 B2
(45) Date of Patent: Nov. 5, 2013

(54) METHOD AND APPARATUS FOR TRACING USERS OF ONLINE VIDEO WEB SITES

(75) Inventors: John Hughes, Albany, CA (US); Tim Wang, Sunnyvale, CA (US); Brian Hafer, Lafayette, CA (US)

(73) Assignee: Tremor Video, Inc., New York, NY (US)

( * ) Notice: Subject to any disclaimer, the term of this patent is extended or adjusted under 35 U.S.C. 154(b) by 0 days.

(21) Appl. No.: 12/212,556

(22) Filed: Sep. 17, 2008

(65) Prior Publication Data

US 2009/0083417 A1    Mar. 26, 2009

Related U.S. Application Data

(60) Provisional application No. 60/960,144, filed on Sep. 18, 2007.

(51) Int. Cl.
  *G06F 15/16*    (2006.01)
(52) U.S. Cl.
  USPC ............................ 709/219; 709/224; 709/225
(58) Field of Classification Search
  USPC .......................................... 709/224, 225, 219
  See application file for complete search history.

(56) References Cited

U.S. PATENT DOCUMENTS

| | | |
|---|---|---|
| 5,617,486 A | 4/1997 | Chow et al. |
| 5,778,340 A | 7/1998 | Hattori |
| 5,864,810 A | 1/1999 | Digalakis et al. |
| 5,951,642 A * | 9/1999 | Onoe et al. .................... 709/224 |
| 6,134,532 A | 10/2000 | Lazarus |
| 6,208,720 B1 | 3/2001 | Curtis et al. |
| 6,223,159 B1 | 4/2001 | Ishii |
| 6,285,999 B1 | 9/2001 | Page |
| 6,343,267 B1 | 1/2002 | Kuhn et al. |
| 6,389,377 B1 | 5/2002 | Pineda et al. |
| 6,505,169 B1 | 1/2003 | Bhagavath et al. |
| 6,560,578 B2 | 5/2003 | Eldering et al. |
| 6,704,930 B1 | 3/2004 | Eldering et al. |
| 6,879,956 B1 | 4/2005 | Honda et al. |
| 6,888,477 B2 | 5/2005 | Lai et al. |
| 6,907,566 B1 | 6/2005 | McElfresh et al. |
| 6,944,585 B1 | 9/2005 | Pawson |

(Continued)

FOREIGN PATENT DOCUMENTS

WO    WO 2006/076661    7/2006

OTHER PUBLICATIONS

Chorianopoulos et al., "Affective Usability Evaluation for an Interactive Music Television Channel," ACM Computers in Entertainment, vol. 2, No. 3, Jul. 2004, Article 7B [retrieved Apr. 24, 2008 ] Retrieved from the Internet. <URL:http://www.dmst.aueb.gr/dds/pubs/jrnl/2004-CIE-VC/html/CS04b.pdf >.

(Continued)

*Primary Examiner* — Harunur Rashid

(57) ABSTRACT

The method and/or apparatus monitors and records the times when a user interacts with a network video player, e.g. a web video player, while watching an online video clip. Specifically, a data collection agent (DCA) is loaded to the player or to a web page that displays the video clip. The DCA collects detailed viewing information and periodically sends this information to a central server. The viewing information is processed by the central server to generate at least one of: a viewership attention span report, a viewership demographics report, and a viewership geographic report.

15 Claims, 5 Drawing Sheets

(56) References Cited

U.S. PATENT DOCUMENTS

| | | |
|---|---|---|
| 6,952,419 B1 | 10/2005 | Cassiday et al. |
| 7,065,488 B2 | 6/2006 | Yajima et al. |
| 7,117,439 B2 | 10/2006 | Barrett et al. |
| 7,136,875 B2 | 11/2006 | Anderson et al. |
| 7,149,772 B1 | 12/2006 | Kalavade |
| 7,356,590 B2 | 4/2008 | Wilson et al. |
| 7,822,636 B1 | 10/2010 | Ferber et al. |
| 8,301,497 B2 | 10/2012 | Amini et al. |
| 2002/0032904 A1 | 3/2002 | Lerner |
| 2002/0049635 A1 | 4/2002 | Mai et al. |
| 2002/0059604 A1 | 5/2002 | Papagan et al. |
| 2002/0068525 A1 | 6/2002 | Brown et al. |
| 2002/0082941 A1 | 6/2002 | Bird |
| 2002/0087980 A1 | 7/2002 | Eldering et al. |
| 2002/0144261 A1 | 10/2002 | Schwalb et al. |
| 2002/0174425 A1* | 11/2002 | Markel et al. .................. 725/13 |
| 2003/0050863 A1 | 3/2003 | Radwin |
| 2003/0055729 A1 | 3/2003 | Bezos et al. |
| 2003/0061566 A1 | 3/2003 | Rubstein et al. |
| 2003/0070167 A1 | 4/2003 | Holtz et al. |
| 2003/0076347 A1 | 4/2003 | Barrett et al. |
| 2003/0079226 A1 | 4/2003 | Barrett |
| 2003/0101230 A1* | 5/2003 | Benschoter et al. .......... 709/217 |
| 2003/0121046 A1 | 6/2003 | Roy et al. |
| 2003/0142670 A1 | 7/2003 | Gould et al. |
| 2003/0174837 A1 | 9/2003 | Candelore et al. |
| 2003/0206720 A1 | 11/2003 | Abecassis |
| 2003/0220791 A1 | 11/2003 | Toyama |
| 2004/0001081 A1 | 1/2004 | Marsh |
| 2004/0003397 A1 | 1/2004 | Boston et al. |
| 2004/0051812 A1* | 3/2004 | Hayward ...................... 348/460 |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0172267 A1 | 9/2004 | Patel et al. |
| 2004/0204983 A1 | 10/2004 | Shen et al. |
| 2004/0267806 A1 | 12/2004 | Lester |
| 2005/0021403 A1 | 1/2005 | Ozer et al. |
| 2005/0076357 A1 | 4/2005 | Fenne |
| 2005/0102375 A1* | 5/2005 | Varghese ...................... 709/219 |
| 2005/0114198 A1 | 5/2005 | Koningstein et al. |
| 2005/0137958 A1 | 6/2005 | Huber et al. |
| 2005/0149396 A1 | 7/2005 | Horowitz et al. |
| 2005/0182626 A1 | 8/2005 | Kim et al. |
| 2005/0190973 A1 | 9/2005 | Kristensson et al. |
| 2005/0192802 A1 | 9/2005 | Robinson et al. |
| 2005/0210145 A1 | 9/2005 | Kim et al. |
| 2005/0246348 A1* | 11/2005 | Hijikata et al. ................. 707/10 |
| 2006/0026628 A1 | 2/2006 | Wan et al. |
| 2006/0058999 A1 | 3/2006 | Barker et al. |
| 2006/0063587 A1 | 3/2006 | Manzo |
| 2006/0074753 A1 | 4/2006 | Schuh et al. |
| 2006/0116924 A1 | 6/2006 | Angles et al. |
| 2006/0135232 A1 | 6/2006 | Willis |
| 2006/0156326 A1 | 7/2006 | Goronzy et al. |
| 2006/0161553 A1 | 7/2006 | Woo |
| 2006/0167749 A1 | 7/2006 | Pitkow et al. |
| 2006/0212350 A1 | 9/2006 | Ellis et al. |
| 2006/0212897 A1 | 9/2006 | Li et al. |
| 2006/0224444 A1 | 10/2006 | Koningstein et al. |
| 2006/0224448 A1 | 10/2006 | Herf |
| 2006/0242016 A1 | 10/2006 | Chenard |
| 2007/0055986 A1 | 3/2007 | Gilley et al. |
| 2007/0067215 A1 | 3/2007 | Agarwal et al. |
| 2007/0078707 A1 | 4/2007 | Axe et al. |
| 2007/0078948 A1 | 4/2007 | Julia et al. |
| 2007/0094363 A1 | 4/2007 | Yruski et al. |
| 2007/0101387 A1 | 5/2007 | Hua et al. |
| 2007/0112567 A1 | 5/2007 | Lau et al. |
| 2007/0112630 A1 | 5/2007 | Lau et al. |
| 2007/0184820 A1 | 8/2007 | Marshall |
| 2007/0219984 A1 | 9/2007 | Aravamudan et al. |
| 2007/0226365 A1 | 9/2007 | Hildreth et al. |
| 2007/0268164 A1 | 11/2007 | Lai et al. |
| 2007/0300258 A1 | 12/2007 | O'Connor et al. |
| 2008/0010339 A1 | 1/2008 | Shin et al. |
| 2008/0010654 A1 | 1/2008 | Barrett et al. |
| 2008/0045336 A1 | 2/2008 | Stelzer et al. |
| 2008/0046562 A1 | 2/2008 | Butler |
| 2008/0059312 A1 | 3/2008 | Gern et al. |
| 2008/0066107 A1 | 3/2008 | Moonka |
| 2008/0098301 A1 | 4/2008 | Black et al. |
| 2008/0109300 A1 | 5/2008 | Bason |
| 2008/0109391 A1 | 5/2008 | Chan |
| 2008/0133475 A1 | 6/2008 | Fischer |
| 2008/0178234 A1 | 7/2008 | Eyal |
| 2008/0183555 A1 | 7/2008 | Walk |
| 2008/0195761 A1 | 8/2008 | Jabri et al. |
| 2008/0207182 A1 | 8/2008 | Maharajh et al. |
| 2008/0228576 A1 | 9/2008 | Yonezaki |
| 2008/0228581 A1 | 9/2008 | Yonezaki et al. |
| 2008/0288973 A1 | 11/2008 | Carson et al. |
| 2008/0300989 A1 | 12/2008 | Coker et al. |
| 2008/0307454 A1 | 12/2008 | Ahanger et al. |
| 2008/0319827 A1 | 12/2008 | Yee et al. |
| 2008/0320531 A1* | 12/2008 | Kim et al. ....................... 725/87 |
| 2009/0007172 A1* | 1/2009 | Ahanger et al. ................ 725/36 |
| 2009/0013347 A1 | 1/2009 | Ahanger et al. |
| 2009/0019488 A1* | 1/2009 | Ruiz-Velasco et al. ......... 725/43 |
| 2009/0077033 A1 | 3/2009 | McGary et al. |
| 2009/0089830 A1 | 4/2009 | Chandratillake et al. |
| 2009/0094520 A1 | 4/2009 | Kulas |
| 2009/0119169 A1 | 5/2009 | Chandratillake et al. |
| 2009/0171728 A1 | 7/2009 | Yan et al. |
| 2009/0259551 A1 | 10/2009 | Chenard et al. |
| 2009/0259552 A1 | 10/2009 | Chenard et al. |
| 2010/0011020 A1 | 1/2010 | Bouzid et al. |
| 2010/0023960 A1 | 1/2010 | Hasson |
| 2010/0049613 A1 | 2/2010 | Angles et al. |
| 2010/0057576 A1 | 3/2010 | Brodersen et al. |
| 2010/0088394 A1 | 4/2010 | Barbieri et al. |
| 2010/0088614 A1 | 4/2010 | Barbieri et al. |
| 2010/0114696 A1 | 5/2010 | Yang |
| 2010/0191680 A1 | 7/2010 | Lee et al. |
| 2011/0010231 A1 | 1/2011 | Price |
| 2011/0029666 A1 | 2/2011 | Lopatecki et al. |
| 2011/0078018 A1 | 3/2011 | Chunilal |
| 2011/0093783 A1 | 4/2011 | Parra |
| 2011/0125573 A1 | 5/2011 | Yonezaki et al. |
| 2011/0225608 A1 | 9/2011 | Lopatecki et al. |
| 2011/0295716 A1 | 12/2011 | Dumon et al. |
| 2012/0278169 A1 | 11/2012 | Lau et al. |
| 2013/0145388 A1 | 6/2013 | Girouard |

OTHER PUBLICATIONS

Hanjalic, A. et al, "Affective video content representation and modeling," IEEE Transactions on Multimedia, 7(1):143-154 (2005).

Mihalcea, R. et al., "A corpus-based approach to finding happiness," AAAI Spring Symposium, pp. 1-6 (2006).

Mihalcea, R. et al., "Learning to laugh (automatically): computational models for humor recognition," 22(2):126-142 (2006).

Young et al., "The HTK book," Hidden markov model toolkit user manual, Microsoft (2000).

Flanagan, David, "JavaScript: The Definitive Guide, 5$^{th}$ Edition" Aug. 17, 2006, O'Reilly Media, pp. 271-272 and 536-538.

* cited by examiner

Attention Span Report
*Find out how much of your video is being viewed.*
*Roll over points for detail about that point in the video.*

Legend
⊘ 50,000-100,000
⊗ 1,000-50,000
⊙ 0-1,000

METHOD AND APPARATUS FOR TRACING USERS OF ONLINE VIDEO WEB SITES

CROSS-REFERENCE TO RELATED APPLICATIONS

This patent application claims the benefit of U.S. provisional Ser. No. 60/960,144, A Method and Apparatus for Tracing Users of Online Video Web Sites, filed Sep. 18, 2007, the entirety of which is incorporated herein by this reference thereto.

BACKGROUND OF THE INVENTION

1. Technical Field

This invention relates generally to the field of monitoring websites. More specifically, this invention relates to a method and system for monitoring online video sharing websites.

2. Background

The number and popularity of Web 2.0 websites is rapidly increasing. Generally, a Web 2.0 website is a site where a user is able to create an account, upload, share, contribute, comment, vote or read personal opinions of other users, all on the same site. Many of the Web 2.0 websites, such as YouTube™, MetaCafe™, Google® video, Yahoo!® video, Myspace-.com®, users' blogs, etc. provide video sharing services.

A video sharing, or online video, service allows individuals or content publishers to upload video clips to Internet websites. The website stores the video clip on its server, and provides different types of functions to allow others to view that video clip. For example, the website may allow commenting and rating of a video clip. Many services have publication options, e.g. private sharing. Video sharing services can be classified into several categories, e.g. user generated video sharing websites, video sharing platform, white label providers, web-based video editing.

As video hosting websites are becoming increasingly popular, such websites provide a platform for traditional publishers, such as TV broadcasters, to use these websites as another medium to display media content. For example, CBS and CNN networks often publish video clips on YouTube. For such publishers it is highly desirable to know the "ratings" of their published video clips. In television, the ratings, e.g. Nielsen Ratings determine the audience size and composition of television programming as well as advertising rates. This method is not applicable for the Internet.

In the related art, there are different techniques to determine the popularity of a website. One technique known in the art refers to "page-hit" (or "page views"). The "page-hit" refers to an event wherein a server receives a request for a page and then serves up the page. A common measure of traffic at a website is in the number of page hits, especially in an advertising context for particular pages or sets of pages. Page hit counts are a rough measure of the traffic of a website. Other techniques involve analyzing traffic between the Web server and clients. These techniques work well when the traffic of interest relates to particular pages, but are generally uninformative when traffic by topic is desired because one page may relate to multiple topics. Systems have been suggested for embedding script code in web pages for tracking user activity on a web page.

The rating of video clips on video hosting websites can be determined using viewership information provided by these sites. Typically, the sites count the cumulative number of users who view the clip. However, more refined measurements that include, for example, the quantity and characteristics of viewers as well as detailed information about the duration and repetition of each view, are neither generated by video sharing websites nor by any other prior art technique. Furthermore, the viewership information can be easily manipulated by using, for example, scripts, browser refreshes, and other fraudulent means. As a result, ratings measured based on the viewership information are inaccurate at best and often misleading. Systems have been suggested for placement of advertising slots in hosted video clips. In such systems, methods are used to track the ad placement and viewing. Such methods require preparation of the video clips for ad placement.

Frameworks described in the prior art enable collection of application events in distributed internet applications. These frameworks require the application to be specifically instrumented through an Application Programming Interface (API), which requires software development capability for use of the API and system resources such as storage to the file system for running the API.

SUMMARY OF THE INVENTION

The system collects viewership data for each video clip embedded in a web page. In one embodiment, a data collection agent (DCA) is loaded to the player or to a web page that displays the video clip. The DCA collects detailed viewing information and periodically sends this information to a viewership analytics server (VAS). In one embodiment, the data is sent to the VAS as a hypertext transfer protocol (HTTP) request. The VAS processes data and generates reports on at least one of: viewership attention span, viewership demographics, and viewership geography.

DETAILED DESCRIPTION OF THE INVENTION

In one embodiment, the invention comprises a method and/or an apparatus for monitoring and recording when a user interacts with a video player while watching a video clip online. Specifically, a data collection agent (DCA) is loaded to the player or to a web page that displays the video clip. The DCA collects detailed viewing information and periodically sends this information to a central server. The viewing information is processed by the central server to generate at least one of: a viewership attention span report, a viewership demographics report, and a viewership geographic report.

Figure 1:
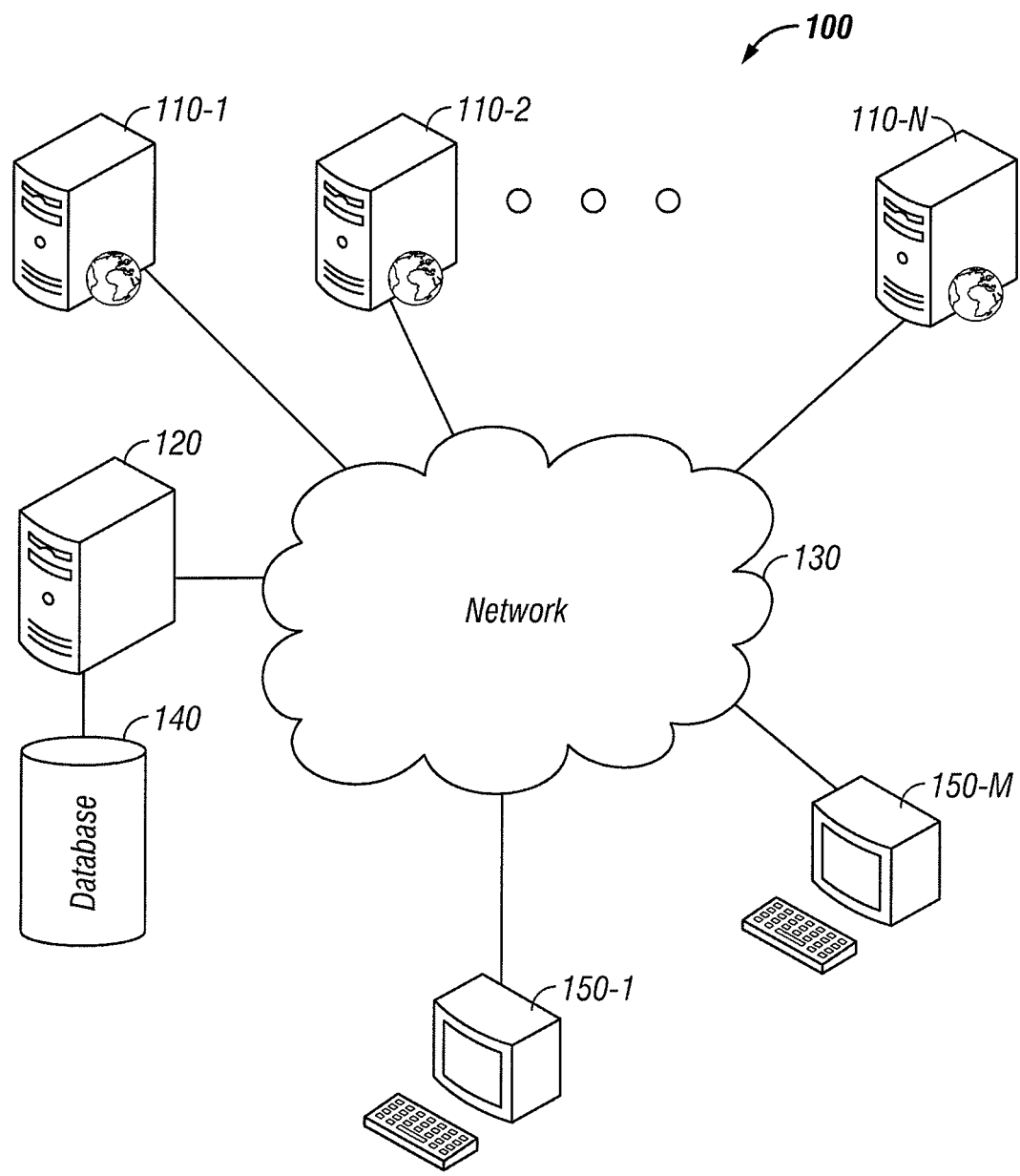
FIG. 1 is a diagram of a network that illustrates the various embodiments according to one embodiment of the invention.

FIG. 1 shows an exemplary and non-limiting diagram of a network 100 used to describe one embodiment of the invention. The network 100 includes at least a web server 110 for hosting video sharing websites. The websites include, but are not limited to, YouTube™, MetaCafe™, Google® video, Yahoo!® video, Myspace.com®, users' blogs, etc.

A viewership analytics server (VAS) 120 can connect to each web server 110 through a network 130, for example, but not limited to, a wide area network (WAN), which enables connectivity such as Internet connectivity. The VAS 120 executes the tasks related to gathering of viewership information for web servers 110, analyzing the gathered information and generating reports on the quantity and characteristics of viewers as well as information about the duration and repetition of each view. These tasks are described in greater detail below. The VAS 120 is connected to a database 140 where the collected and generated viewership data is saved.

Clients 150-1 through 150-M communicate with web servers 110 through the network 130. A client 150 comprises at least a web browser, such as Microsoft® Internet Explorer allowing the user to view and navigate through web pages downloaded from one or more servers 110. Each client 150 is capable of downloading, playing and displaying video clips provided by the servers 110. With this aim, each client 150 is capable of running a video player (not shown), which is typically integrated into a web page. The video player may be, but is not limited to, Flash based web player, DivX web player, Microsoft Media Player, etc.

In accordance with the principles of the present invention, a data collector agent (DCA) is loaded to video sharing websites hosted on servers 110, to capture information about the interactions of the viewers with web players. The DCA may be a script code, e.g. JavaScript, hosted by the VAS 120 and loaded to web pages hosted on servers 110. The DCA may be also in a form of a plug-in installed in the video players provided by video content providers.

The DCA collects and sends to the VAS 120 metadata and detailed viewing information. The metadata comprises at least a video identification (ID), a publisher ID, a website ID that is derived from the uniform resource locator (URL), a length of the video clip being viewed, and the current time. The detailed viewing information includes the actions performed on the player and a timestamp. The recorded actions may be, for example, playing, pausing, rewinding, forwarding, and so on. The timestamp start and end times are expressed, for example, in seconds from the beginning of the video clip. For instance, the pair <play, 20-35> means that a user viewed the clip for only for 15 seconds starting at the 20$^{th}$ second from the beginning. The pair <pause, 30> means that the user paused 30 seconds after the beginning of the clip. The data gathered by the DCA is used by the VAS 120. In one embodiment, these requests are sent to the VAS 120 in the form of a hypertext transfer protocol (HTTP) request. An HTTP request that includes the metadata is sent to the VAS 120 once a web page, including the DCA, has completely uploaded to a client's 150 browser. The detailed viewing information, including the pairs of actions and timestamps, is periodically sent to the VAS 120. The VAS 120 extracts the data encapsulated in the received requests and saves the data in the database 140.

In accordance with one embodiment of the invention users, e.g. advertisers and content publishers, can access the VAS 120 through, for example, a client 150. This process is similar to how a user viewing the content would access the VAS 120. Advertisers and content publishers can designate which websites, publishers, and video clips to trace. In one embodiment of the invention, the user views generated data from the VAS 120 by logging onto a website.

Figure 2:
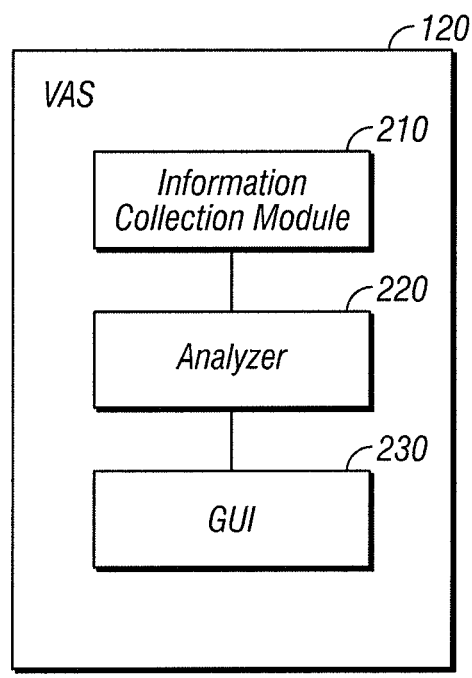
FIG. 2 is a block diagram of the VAS according to one embodiment of the invention.

FIG. 2 shows an exemplary and non-limiting block diagram of the VAS 120 implemented in accordance with one embodiment of the invention. The VAS 120 includes an information collection module 210, an analyzer 220, and a graphical user interface (GUI) module 230. The collection module 210 communicates with a DCA on a client 150 for the purpose of receiving HTTP requests and responding thereto. Specifically, the module 210 generates HTTP responses containing the script code of the DCA. The information collection module 210 further receives the HTTP requests including the data collected by the DCA, extracts the information from the requests and saves the information in database 140. This information includes detailed viewing information and content metadata, which is saved together with tracking data including, but not limited to, the Internet protocol (IP) address as well as the operating system and browser type of the client 150. The detailed viewing information is saved in an entry associated with the video ID. In an exemplary embodiment, the database 140 includes a table having the following fields: video_ID, website_ID, publisher_ID, date, IP, OS, browser type, and <action, timestamp> pairs.

The analyzer 220 processes the information saved in the database 140 to generate viewership-related analytics data, attention span report, and viewership demographics. Viewership-related analytics data includes, but is not limited to, the number of viewers during any period of time, e.g. last three days, last week, last months, etc. for a video clip, for a publisher, or for a group of video clips over different periods of time. This information can be generated for a single website or across a plurality of websites. In order to generate the analytics data mentioned herein, the analyzer 220 first computes the number of viewers in each day, or any other time interval, from the gathered information. The process for generating the viewership-related analytics data is further discussed in U.S. patent application Ser. No. 11/871,880, A Method and System for Monitoring Online Video, assigned to common assignee, the entirety of which is incorporated herein by this reference thereto.

The analyzer 220 further generates an attention span report that includes detailed information about the duration and repetition of each view. This report further includes, per each video clip, the total number of viewers, and the number of viewers that viewed the complete video clip. This report is produced by processing the data stored in the database 140. In addition, the analyzer 220 produces a viewership-geographic report. This report includes the number of viewers of a video clip in each country around the globe. The report is generated by correlating the number of views with IP addresses of the different viewers. Furthermore, a viewership demographics report is generated by analyzer 220. This report correlates the number of viewers with demographics including race, age, income, educational attainment, employment status, etc. The demographics are retrieved from the users' profiles as saved in the online video websites, if and when available.

In accordance with another embodiment, the analyzer 220 can detect fraud attempts. Such attempts are typically performed by browser refreshes or scripting intended to artificially inflate the view count. With this aim, the analyzer 220 maintains a history file of the video IDs that have been viewed in the past during a predefined period of time, e.g. video clips viewed in last 2 hours, by each IP address. If the analyzer 220 detects multiple views above a threshold from the same IP address within a predefined period time, the analyzer 220 discards the data regarding the subsequent views or any views. The analyzer 220 also validates that the database 140 does not contain timestamp entries with duration longer than the length of the video clip. This check protects against scripting attacks intended to record repeated video views under a single view count.

Figure 3A:
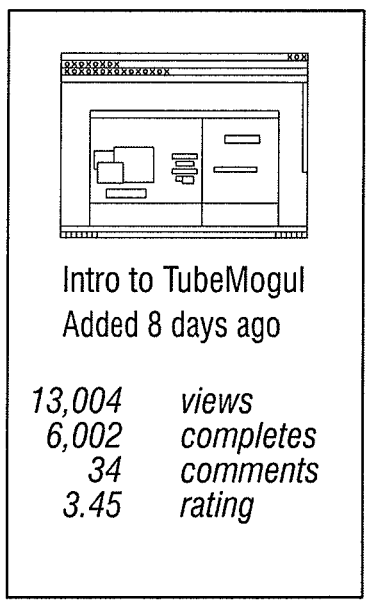
FIGS. 3A-3C are exemplary charts generated by the VAS according to one embodiment of the invention.
Figure 3A:
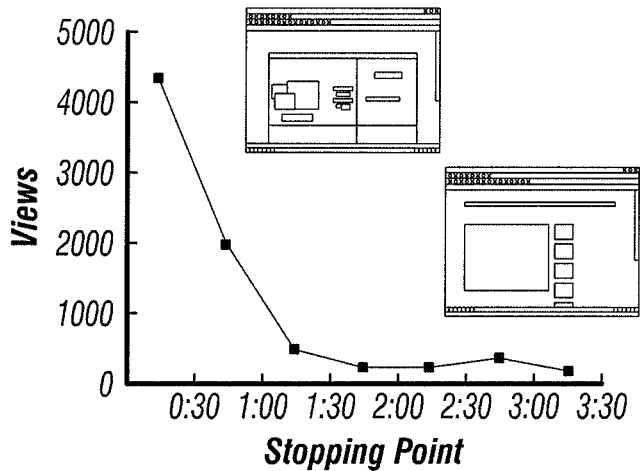
Figure 3B:
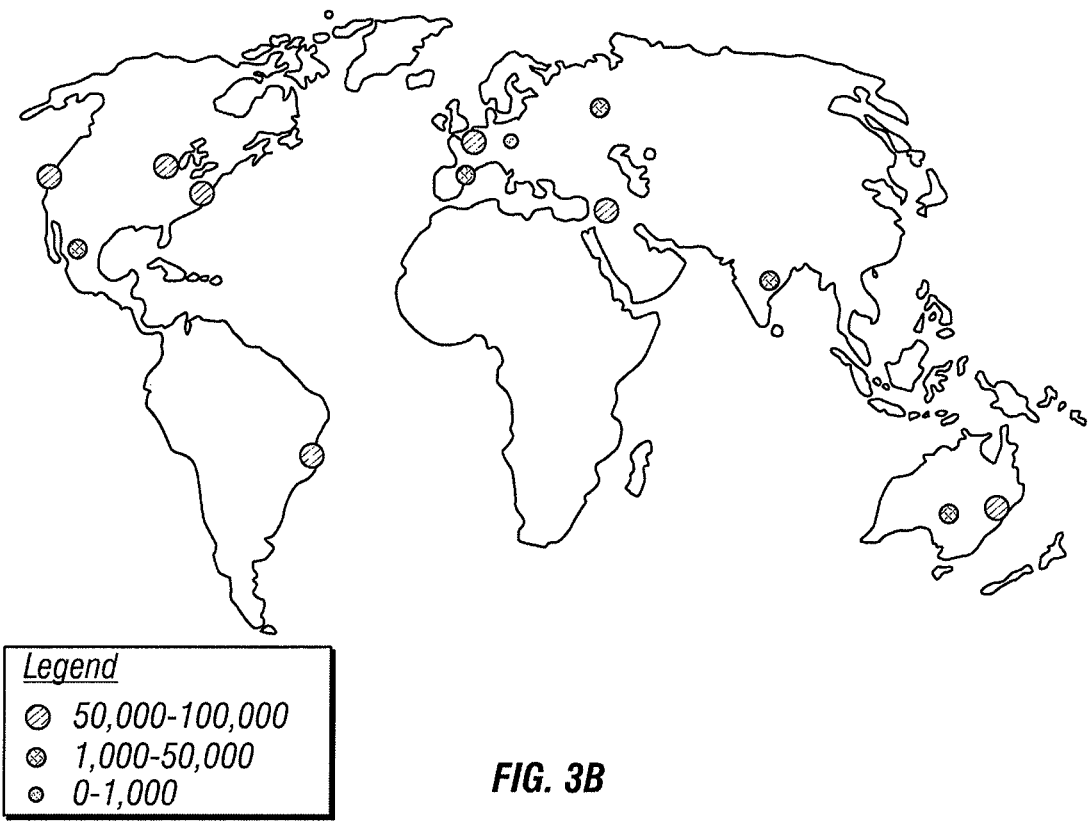

The GUI 230 displays the viewership-related analytics data produced by the analyzer 220 as charts or text-based reports. In one embodiment, the charts are dynamic. That is, the GUI 230 dynamically changes the displayed content of the chart as the user changes the chart's time scale. FIG. 3 shows examples charts of the various reports as generated by the GUI 230 according to several embodiments of the invention. FIG. 3A is a chart that shows an attention span report. FIG. 3B is a chart representing the viewership by geography.

Figure 3C:
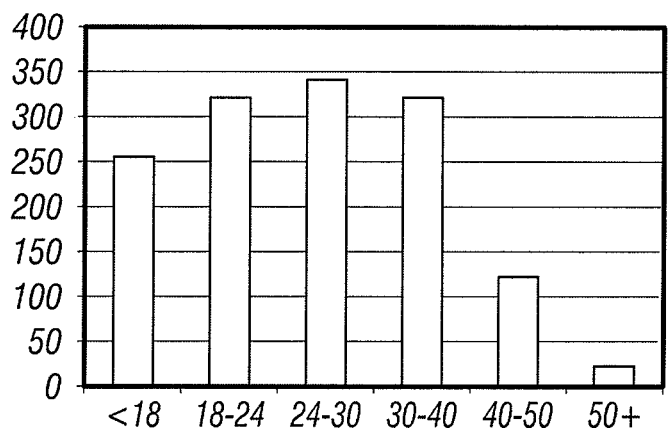
Figure 3C:
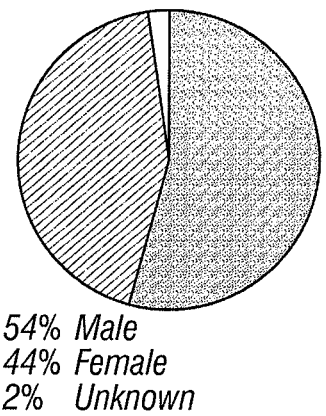

FIG. 3C shows charts of viewership demographics, specifically, the age distribution and gender distribution of viewers.

Figure 4:
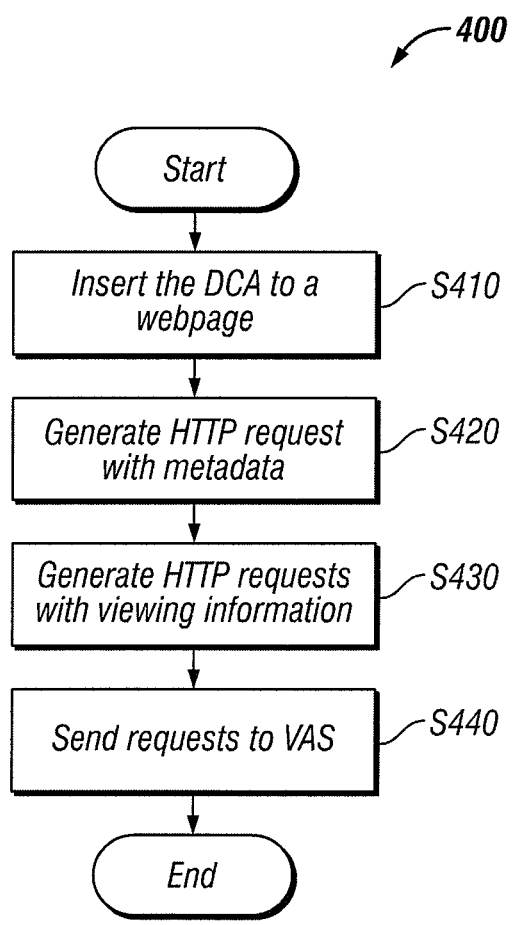
FIG. 4 is a flowchart that describes the operation of the DCA in accordance with an embodiment of the invention.

FIG. 4 shows an exemplary and non-limiting flowchart 400 of the steps for operating the DCA in accordance with one embodiment of the invention. When a web page that includes a video clip is loaded, the DCA is inserted S410 on the page and sets a "3rd party" cookie in the browser to be used for tracking the video viewing activity of each unique user across all video providers. The DCA is inserted on the web page using an HTTP response from the server 110 and contains a script code. The DCA generates S420 an HTTP request that includes metadata and sends the request to the VAS 120. This request contains the provider site (in the URL path) and the ID of the video being viewed, the local client's current time, the client time zone offset, and the non-personally identifiable provider user ID. The VAS 120, upon receiving this request, extracts the metadata and saves it in database 140. Once the video clip is internally loaded in the player, the DCA generates S430 HTTP requests that include the detailed viewing information, for example in the format described above. Thereafter, these HTTP requests are periodically sent S440 to the VAS 120. It should be noted that once the web page is closed or the browser window location is changed while a video clip is being viewed, the DCA transmits an HTTP request that includes the final data pair that ends at the current viewing time-point.

It should be appreciated by a person skilled in the art that methods, processes and systems described herein can be implemented in software, hardware, firmware, or any combination thereof. The implementation may include the use of a computer system having a processor and a memory under the control of the processor, the memory storing instructions adapted to enable the processor to carry out operations as described hereinabove. The implementation may be realized, in a concrete manner, as a computer program product that includes a tangible computer readable medium holding instructions adapted to enable a computer system to perform the operations as described above.

The invention claimed is:

1. A method for collecting viewer behavior data for at least one viewer of at least one video clip displayed on a web page, the method comprising:

receiving the web page that makes use of a video player of the at least one viewer, a data collection agent (DCA) being embedded within the video player, and the web page providing access to the at least one video clip, said DCA communicatively coupled by using a hypertext transfer protocol (HTTP) to a viewership analytics server (VAS), said DCA containing a script code for collecting viewership information associated with said at least one video clip;

generating a first HTTP request by the DCA when the video player is in use, said first HTTP request including metadata associated with said at least one video clip, said metadata including (1) an identification for said at least one video clip, (2) a publisher identifier, (3) a web page identifier, and (4) at least one of a length of said at least one video clip or a current time;

generating a second HTTP request by the DCA, said second HTTP request including said viewership information associated with said at least one video clip of said web page, said viewership information including (1) an action performed on said video player that displays said at least one video clip on said web page and (2) a timestamp of start and end times for said at least one video clip displayed by said video player on said web page; and sending said first HTTP request and said second HTTP request to said VAS such that said VAS (1) analyzes said metadata associated with said at least one video clip and said viewership information associated with said at least one video clip and (2) generates at least one report of said metadata associated with said at least one video clip and said viewership information associated with said at least one video clip.

2. The method of claim 1, wherein said action performed on said video player includes at least one of playing, pausing, rewinding, or forwarding.

3. The method of claim 1, wherein said first HTTP request and said second HTTP request are generated at least once a minute, once an hour, once a day, once a week, or once a month.

4. A method for processing viewer behavior data for at least one viewer of at least one video clip, the method comprising:

embedding a data collection agent (DCA) into a video player of a client for use by a web page, said DCA collecting at least (1) metadata associated with said at least one video clip and including at least one of a length of said at least one video clip or a current time, and (2) viewership information associated with said at least one video clip when said at least one video clip is displayed by the video player on said web page, said viewership information including (1) an action performed on said video player that displays said at least one video clip on said web page, and (2) a timestamp of start and end times for said at least one video clip displayed by said video player on said web page;

receiving, at a viewership analytics server (VAS), a first hypertext transfer protocol (HTTP) request including said metadata associated with said at least one video clip and a second HTTP request including said viewership information associated with said at least one video clip collected by the DCA when the video player is in use displaying said at least one video clip, said metadata and said viewership information associated with an individual viewer that views said at least one video clip displayed by the video player on said web page;

associating said metadata and said viewership information with tracking information associated with said at least one video clip;

processing said metadata, said viewership information, and said tracking information; and generating at least one report respective of viewership of said at least one video clip based on said metadata, said viewership information, and said tracking information.

5. The method of claim 4, further comprising saving said metadata and said viewership information to a database.

6. The method of claim 5, wherein said database includes a table including at least one of a publisher identifier, an internet protocol (IP) address of the at least one viewer, an operating system (OS) identifier, or a browser type identifier.

7. The method of claim 4, wherein said tracking information includes at least one of an internet protocol (IP) address, an operating system (OS) identifier, or a browser identifier for said at least one video clip.

8. The method of claim 4, wherein said at least one report includes viewership-related analytics data, said viewership-related analytics data includes an identifier of at least one viewer of said at least one video clip during a period of time, said at least one video clip is displayed by the video player on said web page.

9. The method of claim 4, wherein said at least one report includes an attention span report, said attention span report including at least one of a duration identifier and a repetition identifier of each viewer of said at least one video clip, a total number of viewers for said at least one video clip, or a number of viewers of a total length of said at least one video clip.

10. The method of claim 4, wherein said at least one report includes viewership demographics, said viewership demographics including a number of viewers for said at least one video clip including at least one of a country identifier, a race identifier, an age identifier, a gender identifier, an income identifier, an education identifier, or an employment status identifier.

11. A server system for collecting viewer behavior data for at least one viewer of at least one video clip, comprising:
a data collection agent (DCA) implemented in at least one of a memory or a processing device, the DCA configured to be embedded into a video player of a web page of a client, said DCA configured to collect (1) metadata associated with said at least one video clip and including at least one of a length of said at least one video clip and a current time, and (2) viewership information associated with said at least one video clip when said at least one video clip is displayed by the video player on said web page, said viewership information including (1) an action performed on said video player that displays said at least one video clip on said web page, and (2) a timestamp of start and end times for said at least one video clip displayed by said video player on said web page, said DCA containing a script code for collecting said viewership information;
an information collection component implemented in a viewership analytics server (VAS), the information collection component for receiving, from the DCA, a first hypertext transfer protocol (HTTP) request including said metadata and a second HTTP request including said viewership information when the video player is in use displaying said at least one video clip;
an analyzing component implemented in the viewership analytics server (VAS), the analyzing component for analyzing said metadata and said viewership information; and
a graphical user interface (GUI) component for generating at least one report associated with said at least one video clip based at least in part on results of said analyzing of said metadata and said viewership information.

12. The server system of claim 11, wherein said DCA is configured to receive said tracking information including at least one of an internet protocol (IP) address, an operating system (OS) identifier, or a browser identifier for said video clip.

13. The server system of claim 12, further comprising a database for storing said metadata, said viewership information, and said tracking information.

14. The server system of claim 13, wherein said database includes a table including at least one of a publisher identifier, an internet protocol (IP) address of the at least one viewer, an operating system (OS) identifier, or a browser type identifier.

15. The server system of claim 11, wherein said at least one report is defined based at least in part on at least one of viewership demographics, timestamps of start and end times for viewership of said at least one video clip, viewership geography, or said at least one video clip.

* * * * *

UNITED STATES PATENT AND TRADEMARK OFFICE
CERTIFICATE OF CORRECTION

| | | |
|---|---|---|
| PATENT NO. | : 8,577,996 B2 | Page 1 of 1 |
| APPLICATION NO. | : 12/212556 | |
| DATED | : November 5, 2013 | |
| INVENTOR(S) | : Hughes et al. | |

It is certified that error appears in the above-identified patent and that said Letters Patent is hereby corrected as shown below:

In the Claims:

Column 8, line 14, delete "said"

Signed and Sealed this
Twenty-fifth Day of February, 2014

Michelle K. Lee
*Deputy Director of the United States Patent and Trademark Office*